May 17, 1932.  F. C. FRANK  1,858,663
WHEEL
Filed June 16, 1930
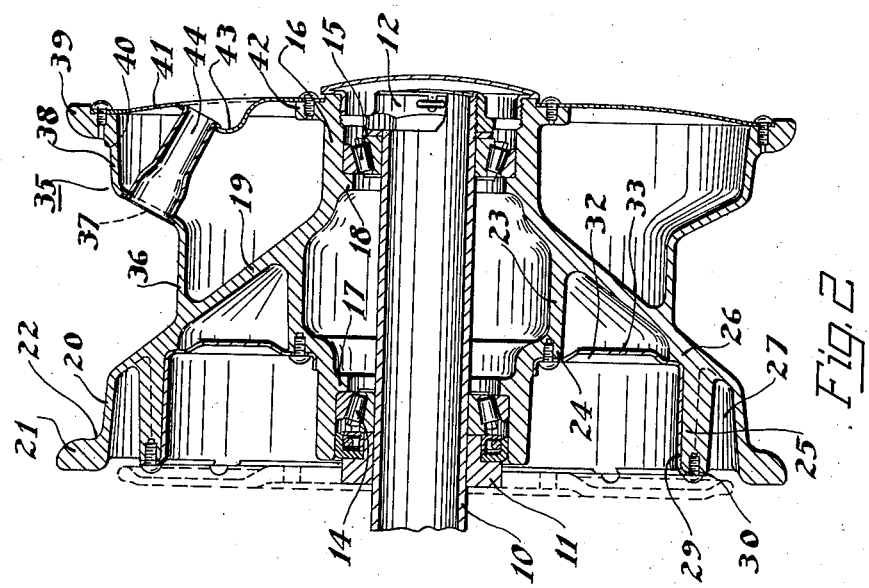
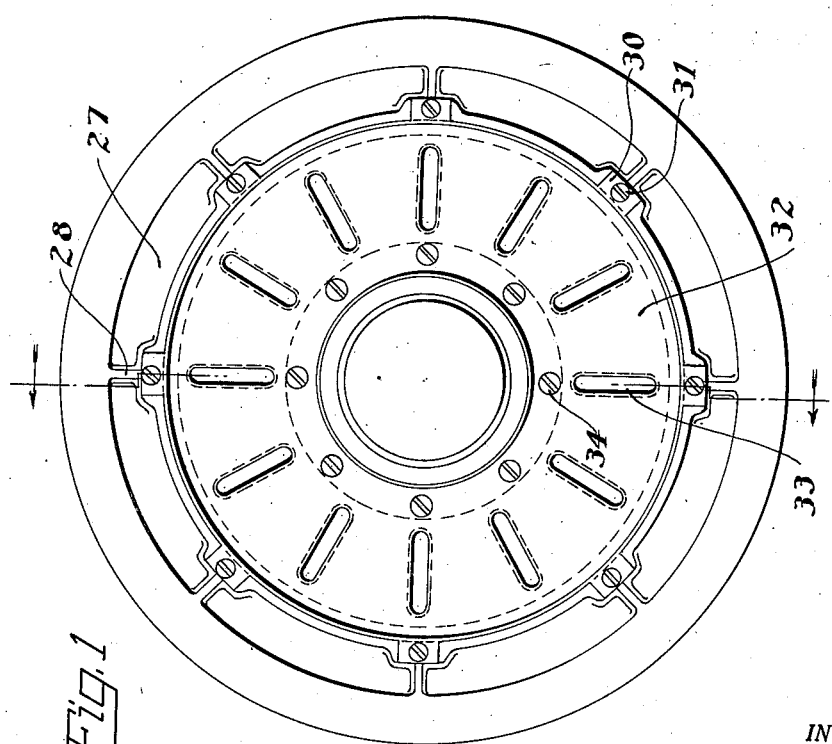
INVENTOR.
FREDERICK C. FRANK
BY
ATTORNEY Patented May 17, 1932

1,858,663

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

WHEEL

Application filed June 16, 1930. Serial No. 461,338.

This invention relates to wheels and more particularly to vehicle wheels.

The invention broadly comprehends a wheel comprising a hub and a rim connected by a frustum supporting a brake drum beneath a portion of the rim and connected thereto by webs. These webs provide, in conjunction with a reinforcing flange on the rim, a circular truss materially strengthening the drum as well as the wheel as a whole. The entire structure may be integrally cast and when so made, there are no shrink strains in any part thereof. An important detail of structure is to be found in the brake liner which materially strengthens the structure and carries at least a portion of the radial load of the wheel.

An object of the invention is to provide a wheel designed to carry a heavy side load as well as a heavy radial load.

Another object of the invention is to provide a wheel having sufficient flexibility to eliminate the possibility of fatigue in the structure.

Another object of the invention is to provide a wheel including an integral brake drum and rim channel.

A further object of the invention is to provide a wheel having a hub and a rim connected by a frustum supporting a brake drum reinforced by the rim.

A further object of the invention is to provide a wheel having a brake drum formed integrally therewith and a liner for the drum constructed and arranged to carry a part of the radial load.

An important feature of the invention is a frustum connecting the hub and the rim of the wheel providing a wall for the rim channel and a support for the brake drum.

Another important feature is a wheel structure in which the rim and a brake drum and a frustum connecting these elements are cast integrally so that shrink strains are eliminated.

Another important feature is a wheel structure comprising a hub, a rim and a brake drum and a frustum shaped member connecting these elements all cast integrally and so arranged with respect to each other that they will possess a certain amount of flexibility which will effectively eliminate the possibility of fatigue in the structure.

Another important feature is a wheel comprising a single casting including a brake drum connected to the rim by spaced ribs arranged to form a circular truss.

Yet another important feature of the invention is to provide a wheel having a brake drum integral therewith provided with a liner shrunk or forced into the drum and supported by a disk strengthened by radial ribs to carry at least part of the radial load from the rim to the hub.

Other objects and advantages of the invention will more fully appear from the following description taken in connection with the accompanying drawings, which form a part of this specification, and in which:

Figure 1 is a side elevation of a wheel embodying the invention; and

Figure 2 is a sectional view substantially on line 2—2, Figure 1.

Referring to the drawings for more specific details of the invention, 10 represents an axle having a shoulder 11 and a retaining nut 12. Supported on the axle against the shoulder and the retaining nut are suitable bearings 14 and 15 and positioned for rotation on the bearings is a wheel embodying the invention.

As shown, the wheel comprises a hub 16 having spaced internal flanges 17 and 18 positioned between the bearings 14 and 15 and engaging the outer races thereof. Formed on the hub 16 coaxially therewith, is a frustum 19. The smaller end of this frustum is suitably spaced from the front of the hub. As shown, the frustum joins the hub immediately back of the flange 18 and the base of the frustum terminates in a rim portion 20 having a tire retaining flange 21. The rim and flange provide a suitable seat 22 for the tire bead.

The central portion of the hub is cupped to provide an enlargement 23 arranged within and coaxially of the frustum. One end of the enlarged portion merges with the apex or smaller end of the frustum and the other end terminates abruptly in a shoulder 24 positioned in spaced relation to the rear end of the hub, the object of which will hereinafter appear.

A brake drum 25 is formed integrally with the frustum. As shown, this drum is connected to the frustum substantially at the base thereof by a circumferential web 26. The web 26 is formed on the frustum beneath a portion forming a wall of the rim channel 27 and the drum is trussed to the rim by ribs 28. These ribs are arranged in spaced relation to balance the wheel and to equally distribute the weight.

A brake drum liner 29 is shrunk or forced into the drum. This liner is provided with lugs 30 fitted snugly in depressions in the outer edge of the drum to secure the liner against rotation and the liner is secured against endwise or lateral movement by screws 31 threaded through the lugs 30 into the edge of the drum. The liner is formed integrally with a disk 32 having radial strengthening ribs 33 and the disk is secured against the shoulder 24 on the drum as by screws 34. This disk materially strengthens the structure and carries a part of the radial load from the rim to the hub.

A web 35 is formed on the outer wall of the frustum. This web has a cylindrical body portion 36 which forms the bottom of the rim channel and an inclined wall 37 forming a side wall of the channel terminating in a rim portion 38 having a flange 39 providing a seat 40 for the tire bead. The flange 39 supports a disk 41 which is further supported by a circumferential flange 42 on the hub. This disk carries a part of the radial load. As shown, the disk 41 has a depression 43 provided with an aperture in which is suitably secured one end of a valve stem tube 44, the other end of which is secured in the side wall 37 of the rim channel. This depression is sufficiently deep to provide an adequate pocket for a valve cap.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A wheel comprising a hub, a frustum on the hub, a rim supported by the frustum, a drum supported beneath the rim within the frustum, a liner for the drum, a disk supporting the liner and means securing the liner to the hub.

2. A wheel comprising a hub, a frustum on the hub, a rim on the frustum, a brake drum positioned beneath the rim within the frustum, a liner for the brake drum, a disk supporting the liner, strengthening ribs in the disk and means securing the disk to the hub.

3. A wheel comprising a hub, a frustum formed integrally and concentrically therewith, a rim formed on the base of the frustum, retaining flanges on the rim, a disk connecting one of the retaining flanges with the hub, webs, formed beneath the rim, a brake drum supported by the webs, a liner for the brake drum and a disk supporting the liner connected to the hub.

4. A wheel comprising a hub, a frustum formed integrally therewith and concentric thereto, lateral flanges on the frustum providing a tire seat, retaining flanges on the lateral flanges, an annular web on the frustum, lateral webs on the annular web, a drum supported by the annular and lateral webs within the frustum, a liner for the drum, a disk connected to the hub supporting the liner and strengthening ribs in the disk.

5. A wheel comprising coaxially arranged rim and hub portions, said hub portion lying within the outlines of said rim portion, said portions being joined by a wheel body portion fashioned as a frustum of a cone and a braking flange secured to said rim portion at the base of the frustum body part, said braking flange also lying within the outlines of said rim portion.

6. A wheel comprising a drop center rim and a hub portion arranged coaxially of said rim, said hub portion lying within the outlines of said rim portion, said portions being joined by a wheel body member fashioned as a frustum of a cone, one side wall of the drop center portion of said rim constituting a prolongation of said wheel body member and a braking flange secured to said rim portion at the base of the frustum body part, said braking flange also lying within the outlines of said rim portion.

7. A wheel comprising a drop center rim member, a hub member coaxial and coextensive with said rim body, a disk body member connecting said hub and rim members, a braking flange extending from the junction between said wheel body and rim members, said braking flange lying within the outlines of said hub and rim members.

8. A wheel comprising a drop center rim member, a hub member coaxial and coextensive with said rim body, a disk body member connecting said hub and rim members, a braking flange extending from the junction between said wheel body and rim members, said braking flange lying within the outlines of said hub and rim members, together with a liner member fitted within said braking flange, said liner being provided with a radially extending flange secured to the hub member and supplementing the wheel body member.

In testimony whereof, I have hereunto signed my name.

FREDERICK C. FRANK.